No. 794,692. PATENTED JULY 11, 1905.
G. H. STEWART.
MACHINE FOR SOLDERING END SEAMS OF CANS.
APPLICATION FILED NOV. 28, 1904.
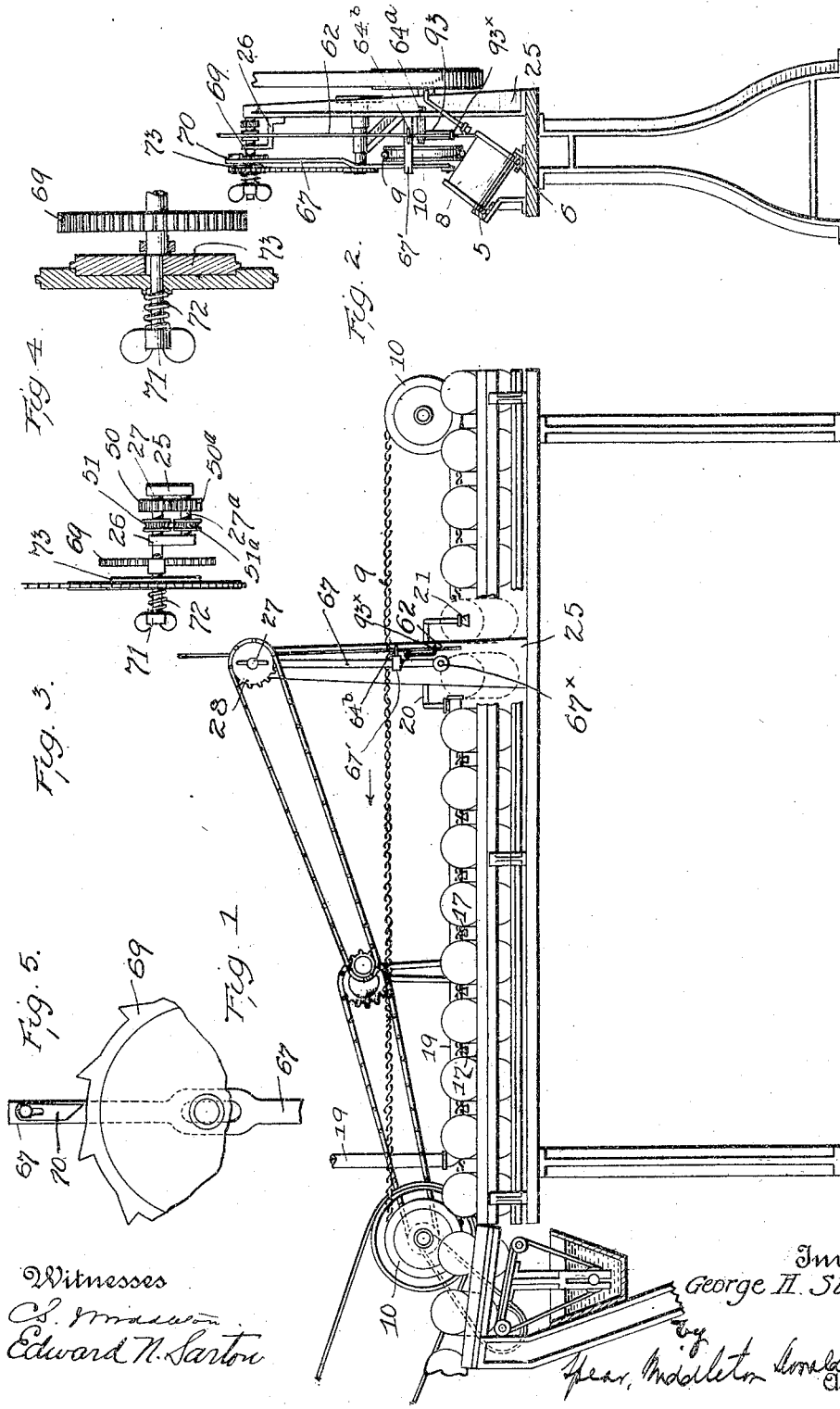

No. 794,692.

Patented July 11, 1905.

UNITED STATES PATENT OFFICE.

GEORGE H. STEWART, OF LOS ANGELES, CALIFORNIA.

MACHINE FOR SOLDERING END SEAMS OF CANS.

SPECIFICATION forming part of Letters Patent No. 794,692, dated July 11, 1905.

Original application filed July 20, 1904, Serial No. 217,407. Divided and this application filed November 28, 1904. Serial No. 234,570.

*To all whom it may concern:*

Be it known that I, GEORGE H. STEWART, a citizen of the United States, residing at Los Angeles, California, have invented certain new and useful Improvements in Machines for Soldering End Seams of Cans, of which the following is a specification.

My invention relates to machinery for the end-seaming of cans, and is of the class in which the cans are moved successively and continuously to the soldering-point.

It is designed to secure automatic sealing of the end seams with certainty and economy by heating the cans prior to applying the solder and applying and melting the solder upon the heated can.

In this machine I have embodied the solder-feeding invention shown in an application filed by me in the United States Patent Office on the 20th day of July, 1904, Serial No. 217,407, of which this is a division.

My said invention is illustrated in the accompanying drawings, in which—

Figure 1 shows a side elevation of the machine in which my invention is embodied; Fig. 2, an end view of the same, partly in section. Figs. 3 and 4 show details on an enlarged scale. Fig. 5 is a detail view of the relative arrangement of the pawl and ratchet.

In the form of machine shown in the drawings the cans are rolled upon ways in a manner substantially the same as that in well-known use. The ways are on a bed suitably supported, as indicated in the drawings, and are composed conveniently of angle-irons, one on a higher plane than the other, as clearly indicated at 5 and 6 in Fig. 2. These tracks extend, as illustrated in Fig. 1, through the length of the machine and carry the cans 8 in the position shown in these figures, although the cans may be nearer each other. These cans, it will be understood, are formed of bodies which have usually been first side-seamed and have the heads placed thereon. The tracks are fitted to allow the cans to roll freely. They are admitted at the receiving end by any suitable device and are moved by means of a continuously-moving endless chain 9, carried on grooved wheels 10 10, driven through any suitable mechanisms. The chain moves in the direction of the arrow, and its lower or directly-operative part rests directly upon the cans, and thus rolls them along.

The seams are first fluxed by any well-known suitable fluxing devices—for example, such as those shown on the left of Fig. 1.

There are various means for applying heat to cans, and I have indicated such of convenient form, consisting of liquid or vapor or gas burners located at the various points 17 in Fig. 1. These are supplied through a fuel-pipe 19, on the horizontal part of which the burners are supported and arranged in such positions and in such numbers as to heat the cans before they reach the soldering devices and to such a degree that the solder may be suitably melted thereon, and it is essential that the heating device, whatever its character, shall be located in such place or places on the line of the moving cans that these cans will be heated before they arrive at that part of the way where the solder is to be applied and heated to such a degree that the solder may be effectively applied by means of the heat of the cans. The point where the application of the soldering begins is indicated in Fig. 1 at 62, which marks particularly the solder-wire. A branch fuel-supply pipe 20 is carried around the soldering position, and has a burner at its end (shown at 21) which may be used whenever necessary to maintain the heat of the can after the solder has been applied.

The position and general character of the solder-feeding devices are shown in Figs. 1 and 2; but the precise construction is more clearly shown in Figs. 3 and 4.

The devices for advancing the solder-wire intermittingly are substantially the same as those shown in my aforesaid application, as will be hereinafter described.

A standard 25 on the base carries in suitable bearings a shaft 27, on which, loosely mounted, is a sprocket-wheel 28, driven by any suitable mechanism—such, for example, as the chain and its connections, (sufficiently shown on the left of Fig. 1.) This sprocket-wheel is in frictional contact (regulated by a spring 72 and the nut 71 on the end of the shaft) with a wheel 73, fixed on the shaft, the friction being sufficient to drive the feeding mechanism when it is unimpeded. Between the standard 25 and the bearing 26, supported thereon, are the immediate feeding devices. Of these is a pinion 50, fixed on shaft 27, and a milled grooved wheel 51 on the same shaft and on a counter-shaft 27$^a$ a similar wheel and gear 51$^a$ and 50$^a$, 50$^a$ being in mesh with gear 50 and wheel 51$^a$, forming, with 51, the gripping means for the solder which passes between them. The construction is such that when power is applied to drive the sprocket-wheel it will feed the wire unless force be interposed sufficient to overcome the friction between the sprocket and the fixed wheel 73. Without such impediment the device would feed constantly; but the conditions of automatic soldering for the best effect require that the solder should be applied at proper intervals. To this end I fix on the shaft 27 an escapement-wheel 69, in possible engagement with which at times is an arresting-pawl 70, carried on a bar 67, reciprocating vertically in proper guides. The pawl is adjustable vertically on the rod 67 and is fixed rigidly in adjusted position. The parts are so arranged that when the bar is down the pawl 70 is in engagement with the ratchet-wheel 69 and the feeding mechanisms are arrested, and the sprocket-wheel 28, overcoming its frictional resistance with the wheel 73, moves without effect. The point is to release the solder-feeding mechanism at the proper instant and to allow the solder to be fed during the proper time and then to cease operation. To effect this, the bar 67 is extended down through a suitable guide 67' into range with the rolling cans and is provided with an antifriction-roller 67$^\times$, which directly rides upon the can. A guide-arm 93, pivoted to an arm 64$^a$ on standard 25, serves to guide the solder-wire 62, this wire passing through a keeper 64$^b$ on the guide 67' and through a hole 93$^\times$ in the guide-arm 93 in proper relation to the seam to be soldered. As the roller rides upon the can it lifts the bar 67, disengaging the pawl, and thus releases the ratchet and feed mechanism. The wire 62, fed down through the guides by the wheels 51 51$^a$, is forced through the hole 93$^\times$ in the guide-arm 93 and is laid by the movement of the can directly upon the hot can in proper relation to the seam to be soldered. The advance of the can continues this effect until the roller has ridden over the can and descended a certain distance on the rear side, when the bar 67 is permitted to bring the pawl into engagement with the ratchet-wheel, which arrests the wheel and the feed. This arrest need not be immediately upon the dropping of the pawl. The teeth of the ratchet-wheel may be so spaced, as shown in Fig. 5, as to continue the feed for a certain predetermined time after the descent of the pawl, a space regulated according to the amount of wire found proper to be fed and depending in part at least upon the diameter of the can. Ordinarily one application of the solder is sufficient. As it is wiped upon the hot can it melts and flows throughout the entire circumference; but a second or more solder-feeding mechanisms may be placed in line farther forward to apply solder on other parts of the circumference.

As above indicated, the amount of a single feed of solder depends in this apparatus not only upon the length of time occupied by the pawl in returning to its position, but upon the spacing of the teeth, which after the disengagement of the pawl governs the distance the ratchet-wheel may move over a predetermined space before the succeeding tooth engages the pawl.

I do not limit myself to one feed mechanism nor to the fact that one feed mechanism acts on the whole of the seam. I do not limit myself to the roller on the end of the bar, as other means may be used to cause the can to lift the pawl through the movement of the can.

I claim as my invention—

1. In a machine for soldering end seams of cans and in combination, a way for the cans, means for rolling the cans thereon, a solder-feed mechanism having an arm arranged to be moved by the rolling can, and controlling the feed of the solder when so moved, means for directing the solder upon the rolling can and means for heating the cans before they reach the soldering mechanisms, substantially as described.

2. In a can-soldering machine, and in combination, a way on which the cans are rolled, mechanism for moving the cans, mechanism for controlling the feed of the solder through the movement of the cans, including a device arranged in the path of the cans and to ride over the rolling cans, and means for heating the cans before they reach the soldering mechanism, substantially as described.

3. In a solder-feeding mechanism, a ratchet-wheel having spaces between its teeth corresponding to the amount of solder-feed required, a pawl for arresting the ratchet-wheel, mechanism carrying the pawl and in range of the moving cans, whereby the pawl may be released from the wheel and the feed be started and continued until the pawl comes into contact with the next succeeding tooth of the ratchet-wheel.

4. In a machine for soldering end seams of cans, a way for the cans, means for rolling the cans thereon, solder-feeding mechanism controlled by a member which rides over each can, a guide for the solder-wire, to apply it to the seam, and means for heating the can before it reaches the soldering mechanism, substantially as described.

In testimony whereof I affix my signature in presence of two witnesses.

GEORGE H. STEWART.

Witnesses:
 HENRY E. COOPER,
 EDWARD N. SARTON.